(12) United States Patent
Hizkiev et al.

(10) Patent No.: US 11,615,338 B2
(45) Date of Patent: Mar. 28, 2023

(54) SYSTEM AND METHOD FOR GENERATING A FILE EXECUTION RECORD OF ADDRESS TUPLES

(71) Applicant: BITDAM LTD, Netanya (IL)

(72) Inventors: Maor Hizkiev, Tel-Aviv (IL); Liron Barak, Rishon Lezion (IL); Alex Livshiz, Rishon Lezion (IL); Ran Regenstreif, Tel-Aviv (IL)

(73) Assignee: BITDAM LTD., Miami, FL (US)

( * ) Notice: Subject to any disclaimer, the term of this patent is extended or adjusted under 35 U.S.C. 154(b) by 0 days.

(21) Appl. No.: 15/657,239

(22) Filed: Jul. 24, 2017

(65) Prior Publication Data

US 2019/0026649 A1 Jan. 24, 2019

(51) Int. Cl.
| | | |
|---|---|---|
| *G06N 20/00* | (2019.01) | |
| *G06F 21/51* | (2013.01) | |
| *G06F 21/56* | (2013.01) | |
| *G06F 16/22* | (2019.01) | |
| *G06F 16/951* | (2019.01) | |

(52) U.S. Cl.
CPC ............ *G06N 20/00* (2019.01); *G06F 21/51* (2013.01); *G06F 21/566* (2013.01); *G06F 16/22* (2019.01); *G06F 16/951* (2019.01)

(58) Field of Classification Search
None
See application file for complete search history.

(56) References Cited

U.S. PATENT DOCUMENTS

| | | | |
|---|---|---|---|
| 2005/0108562 A1* | 5/2005 | Khazan | G06F 21/566 726/23 |
| 2008/0052683 A1* | 2/2008 | Bates | G06F 11/3612 717/129 |
| 2008/0235757 A1* | 9/2008 | Li | G06F 9/45558 726/1 |
| 2014/0189864 A1* | 7/2014 | Wang | G06F 21/51 726/23 |
| 2015/0096022 A1* | 4/2015 | Vincent | G06F 21/562 726/23 |

(Continued)

OTHER PUBLICATIONS

Pappas, Vasilis, Michalis Polychronakis, and Angelos D. Keromytis. "Transparent {ROP} Exploit Mitigation Using Indirect Branch Tracing." In Presented as part of the 22nd {USENIX} Security Symposium ({USENIX} Security 13), pp. 447-462. 2013. (Year: 2013).*

(Continued)

*Primary Examiner* — Casey R. Garner
(74) *Attorney, Agent, or Firm* — Maschoff Brennan

(57) ABSTRACT

A system and method generating a database of tuple addresses associated with a computer program, the method comprising fetching from a repository of sample files a sample file suitable for running by the computer program, and performing dynamic learning of the sample file to obtain tuple addresses used by the computer program in loading of the sample file, the dynamic learning comprising while loading of the sample file by the computer program, monitoring loaded processes and modules, for each loaded process, tracing process branches, upon identification of a mispredicted branch, getting an address tuple of the mispredicted branch, and identifying a module to which the tuple belongs based on the module's base address.

19 Claims, 5 Drawing Sheets

(56) References Cited

U.S. PATENT DOCUMENTS

| | | | |
|---|---|---|---|
| 2016/0212159 A1* | 7/2016 | Gupta | G06F 21/54 |
| 2017/0091454 A1* | 3/2017 | Sukhomlinov | G06F 21/52 |
| 2017/0116418 A1* | 4/2017 | Shanmugavelayutham | G06F 21/566 |
| 2017/0180399 A1 | 6/2017 | Sukhomlinov et al. | |

OTHER PUBLICATIONS

Adrian Tang et al: "Unsupervised Anomaly-Based Malware Detection Using Hardware Features" In: "Medical image computing and computer-assisted intervention—MICCAI 2015: 18th international conference, Munich, Germany, Oct. 5-9, 2015; proceedings", Jan. 1, 2014 (Jan. 1, 2014), Springer International Publishing, Cham 032548, XP055427353, ISSN: 0302-9743 ISBN: 978-3-540-70543-7 vol. 8688, pp. 109-129, DOI: 10.1007/978-3-319-11379-1_6, sections L,3, 3.4,3.5;table 2.

\* cited by examiner

SYSTEM AND METHOD FOR GENERATING A FILE EXECUTION RECORD OF ADDRESS TUPLES

FIELD OF THE INVENTION

Some embodiments of the present invention pertain to a cyber-security system, and more specifically to a method for forming a database for identification of malicious files.

BACKGROUND

Some known security system and methods provide a service of scanning e-mail messages and/or attachments in order to alert users against potentially hazardous content. Some of these systems have a significant amount of false positives and false negatives, i.e. the ability of these systems to classify between safe and unsafe content is limited and may cause damage to the users. Additionally, such systems are usually designated for a specific operating system, specific device specific types of attacks and/or specific types of files, and thus lack flexibility and cannot provide a complete solution to an organization, which may use various types of equipment and/or software and may need a protection from various kinds of malicious files.

SUMMARY

An aspect of some embodiments of the present invention provides a system for generating a database of tuple addresses associated with a computer program, the system including a learning server including a hardware processor configured to execute code instructions for: fetching from a repository of sample files a sample file suitable for running by the computer program, and performing dynamic learning of the sample file to obtain tuple addresses used by the computer program in loading of the sample file, the dynamic learning including: while loading of the sample file by the computer program, monitoring loaded processes and modules, for each loaded process, tracing process branches, upon identification of a mispredicted branch, getting an address tuple of the mispredicted branch, and identifying a module to which the tuple belongs based on the module's base address.

Optionally, the dynamic learning includes upon identification of a mispredicted branch marking the mispredicted branch, wherein the getting of an address tuple of the mispredicted branch is by finding a last stored branch marked as mispredicted.

Optionally, the tracing of the process branches is by configuring an interrupt instruction for mispredicted branches and storing a corresponding interrupt handler.

Optionally, the configuring of the interrupt instruction is by setting with a maximal value a performance counter register for counting branch mispredictions, and generating the interrupt instruction upon an overflow of the performance counter register.

Optionally, the dynamic learning comprises keeping another base address for each loaded module by marking the memory space of an unloaded module as occupied.

Optionally, the hardware processor is configured to execute code instructions for receiving an executable file of an operating system (OS) and performing static learning of the OS executable file to obtain tuple addresses.

Optionally, the hardware processor is configured to execute code instructions for generating the repository of sample files by: obtaining a sample file by a web crawler, placing breakpoints on module addresses included in the obtained sample file applying breakpoint discovery and in case a breakpoint is hit, keeping the obtained sample file in the repository.

Optionally, the hardware processor is configured to execute code instructions for obtaining tuple addresses by: setting breakpoints on addresses of operating system (OS) interactions identified in the sample file, and upon breakpoint hit, monitor the next address to complete an address tuple and store the address tuple in a repository.

Optionally, the obtaining of tuple addresses is by counting hits of a breakpoint; and deciding whether to reset the breakpoint based on the hit count.

An aspect of some embodiments of the present invention provides a method for generating a database of tuple addresses associated with a computer program, the method including fetching from a repository of sample files a sample file suitable for running by the computer program, and performing dynamic learning of the sample file to obtain tuple addresses used by the computer program in loading of the sample file, the dynamic learning including while loading of the sample file by the computer program, monitoring loaded processes and modules, for each loaded process, tracing process branches, upon identification of a mispredicted branch, getting an address tuple of the mispredicted branch, and identifying a module to which the tuple belongs based on the module's base address.

BRIEF DESCRIPTION OF THE DRAWINGS

Some non-limiting exemplary embodiments or features of the disclosed subject matter are illustrated in the following drawings.

In the drawings.

Figure 1:
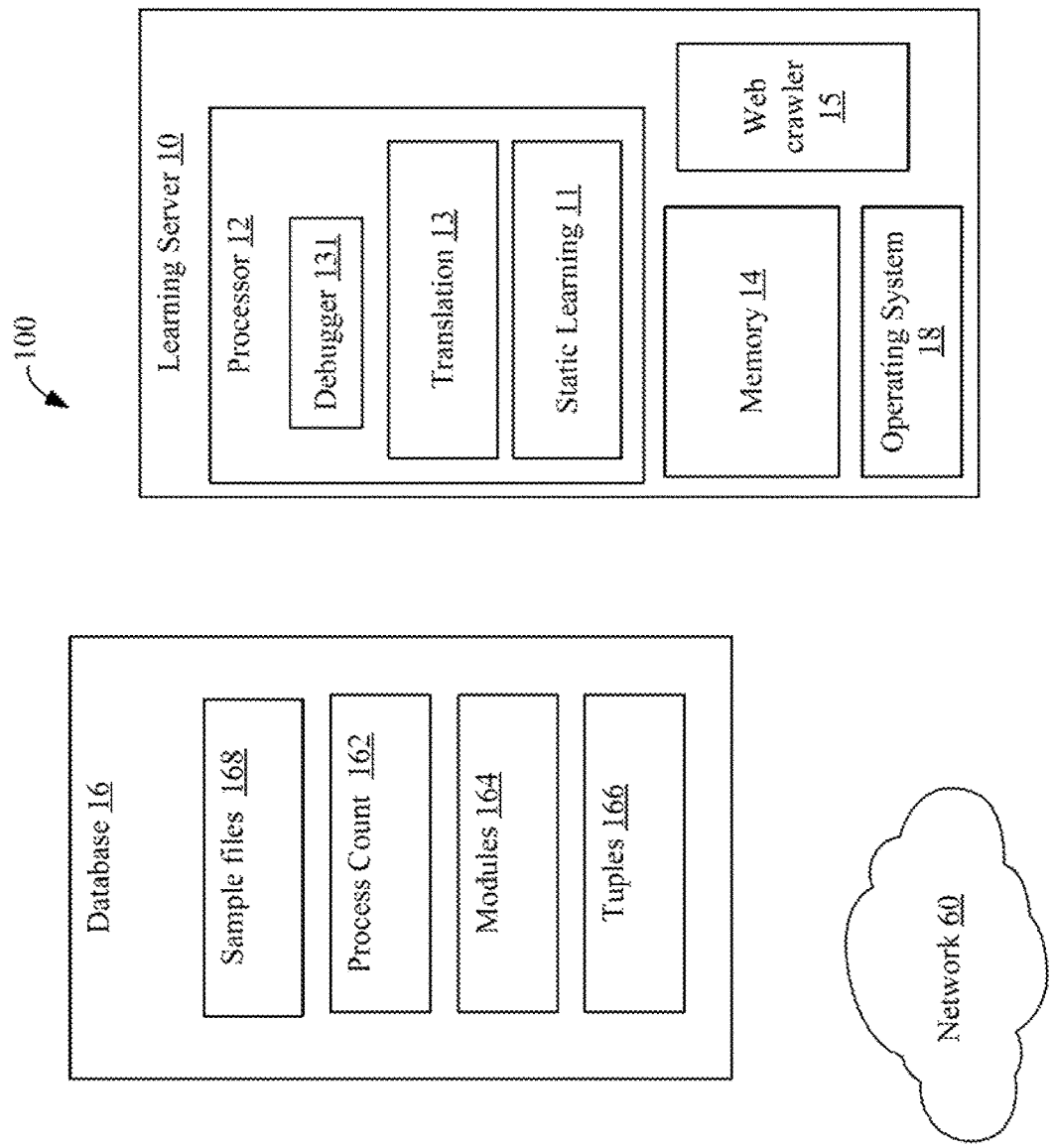
FIG. 1 is a schematic illustration of a system for interception of malicious files, according to some embodiments of the present invention.

With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described. References to previously presented elements are implied without necessarily further citing the drawing or description in which they appear.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

DETAILED DESCRIPTION

Some embodiments of the present invention may provide a system and method for obtaining and translating a file to a list of address tuples, which are used during execution of the file. In some embodiments, the translation is performed by a learning process in which files are executed and the address tuples are followed and recorded.

The system and method described herein, with reference to some embodiments of the present invention, may be used for providing multi-environmental e-mail security, i.e. with the ability to secure efficiently various types of environments and from various types of malicious files and/or cyber-attacks.

In some embodiments, the system and method describe herein facilitate efficient gathering and selection of files for using in the learning process.

Some embodiments of the present invention may include a system, a method, and/or a computer program product. The computer program product may include a tangible non-transitory computer readable storage medium (or media) having computer readable program instructions thereon for causing a processor to carry out aspects of the present invention. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including any object oriented programming language and/or conventional procedural programming languages.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a schematic illustration of a system 100 for interception of malicious files, according to some embodiments of the present invention. In some embodiments of the present invention, system 100 includes a learning server 10 configured to communicate with a computer network 60. For example, network 60 may include the internet and/or an intranet network, and/or any other public and/or private computer network. Learning server 10 may communicate with and/or control a database 16.

Learning server 10 may include at least one hardware processor 12 and a non-transitory memory 14. Processor 12 may be configured to execute code instructions, for example code instructions stored in a non-transitory memory 14. In some embodiments, memory 14 stores code instructions that causes processor 12 to carry out the methods described herein, upon execution of the code instructions by processor 12. Processor 12 may control and/or communicate with network 60 by any suitable wired and/or wireless communication link and/or network.

As described in more detail herein, processor 12 may execute a static learning engine 11 and a translation engine 13. By static learning engine 11, processor 12 may parse binary code of a computer program to be analyzed, e.g. a software and/or an application, and/or analyze the parsed code, to find tuple addresses of address tuples (FROM, TO) used by the analyzed program. An address tuple (FROM, TO), according to some embodiments of the present invention, may include respective FROM address and TO address. The FROM address may be an address of an instruction that directs to another code line. The TO address may be a destination address, e.g. an address of the code line being directed to by the FROM address. For example, processor 12 may extract from a Portable Executable (PE) file or any other suitable program file a text section including binary code of the program, and parse and/or analyze the text section, as described in detail herein.

Translation engine 13 may cause processor 12 to perform a dynamic learning process in which a sample file is translated to a corresponding list of address tuples used in execution of the file. As described in detail herein, processor 12 may obtain sample files for the learning process. The sample files may be executable by corresponding computer programs, e.g. software packages and/or applications, and/or may include documents, slideshows, drawings, media files, and/or any other suitable data and/or executable file that may be opened and/or run by a corresponding computer program. As described in more detail herein, processor 12 may obtain the sample files by web crawlers. In some embodiments, the sample files may include custom-built files uploaded and/or stored in database 16 and/or available to processor 12.

By the dynamic learning process, processor 12 may complete and/or find more address tuples and/or produce a list of tuples used in processing and/or execution of files by a certain computer program. The dynamic learning process may be executed by an operating system 18 installed on server 10 and/or on another machine controlled by processor 12. The produced list of tuples may be verified by processor 12 and/or stored in database 16. As described in detail below, processor 12 may extract and/or store in database 16, for example by static learning engine 11 and/or translation engine 13, various sub-databases such as sub-database 162, 164, and 166. A tuple sub-database 166 may store tuples related to corresponding computer programs and/or to sample files using the tuples. A module sub-database 164 may store lists of operating system (OS) modules and application modules related to corresponding computer programs and/or to sample files using the OS modules. A process-count sub-database 162 may store for each process the number of occurrences of the process in running of a sample file.

Figure 2:
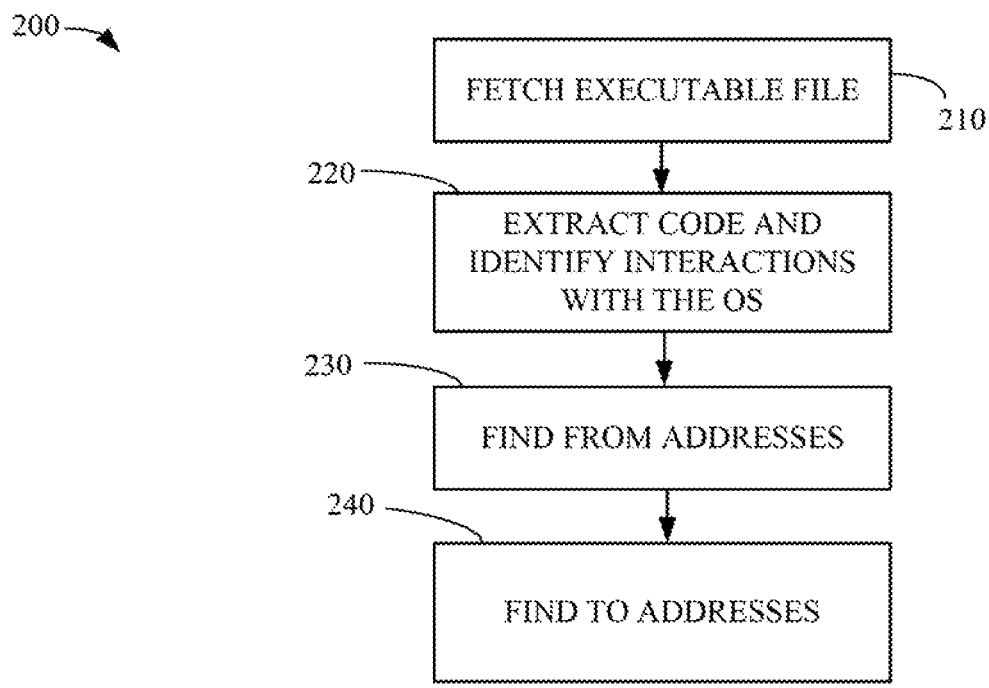
FIG. 2 is a schematic flowchart illustration of a method for static learning, according to some embodiments of the present invention.

Reference is now made to FIG. 2, which is a schematic flowchart illustration of a method 200 for static learning, according to some embodiments of the present invention, which may be performed by at least one hardware processor 12 by execution of static learning engine 11. As indicated in block 210, processor 12 may fetch an executable file of a computer program, e.g. the executable code of the computer program, which may be wrapped in a certain file format such as, for example, a Portable Executable (PE), a Common Object File Format (COFF), an Executable and Linkable Format (ELF), a Mach object, and/or any other suitable executable file format.

As indicated in block 220, processor 12 may identify in the program executable file operating system (OS) interactions, i.e. interactions of the analyzed computer program with the OS. The identification may be performed, for example, by parsing binary code, read only data, address tables, and/or any other suitable section of the program executable file. The identified interactions with the OS may include, for example, call instructions, jump instructions, return instruction, and/or any other suitable instructions that may direct to the operating system. For example, processor 12 may extract from the program executable file the program's binary code, for example by parsing a text section of the program executable file, for example, a section having a .text extension. For example, processor 12 may extract from the program executable file read-only data, for example by parsing a read-only data section of the program executable file, for example, a section having an .rdata extension. For example, processor 12 may extract from the program executable file addresses of imported functions and/or modules, for example from an import address table (IAT).

As indicated in block 230, processor 12 may find and/or identify tuple FROM addresses by parsing the identified OS interactions, e.g. the call instructions, jump instructions, and/or return instruction. For example, processor 12 may disassemble binary code of the program executable file, to parse OS interactions such as, for example, indirect calls, direct calls, indirect jumps, switch jumps, direct jumps, and/or return instructions, and to identify FROM addresses indicated in the instructions.

As indicated in block 240, processor 12 may find tuple TO addresses corresponding to at least some of the identified FROM address.

In some embodiments of the present invention, processor 12 may obtain TO addresses, for example by parsing the OS interactions, from at least some of the OS interactions which indicate destination addresses, such as direct call and/or jump instructions, and/or from at least some of the return instructions.

In some embodiments of the present invention, processor 12 may extract from switch jump instructions corresponding pre-compiled destinations, i.e. TO addresses. For example, in some embodiments, processor 12 may parse a jump table based on an address of the jump table and/or an indication about the table's length, which may be included in the parsed code.

In some embodiments, processor 12 may obtain some TO addresses of indirect call and/or jump instructions, i.e. instructions that direct to locations of destination addresses, and not directly to the corresponding destinations. For example, processor 12 may analyze indirect call and/or jump instructions against registers and/or memory, to find corresponding destination addresses reached following the indirect call and/or jump instructions. Processor 12 may monitor registers and/or memory of a machine executing the analyzed program, and create an indirect destination database of indirect destinations such as, for example, imported function addresses and respective locations in the parsed code. For example, in case of an indirect call instruction that indicate a certain variable's name, processor 12 may find in the indirect destination database an imported function's address that was inserted into the respective variable. For example, in case of an indirect jump or call instruction that directs to a memory address, for example a memory address in an import address table in the read-only data section, processor 12 may parse the respective location in the read-only data section and determine the destination address indicated in this location.

In some embodiments of the present invention, an OS module and/or function, which may be loaded during execution of an OS interaction, may point to another OS module and/or function, for example a user OS module and/or function. That is, loading of the OS module and/or function may result in loading of another, OS user module and/or function, which is the actual resulting destination. Processor 12 may dynamically load the OS module and/or function and parse the actual resulting destination, in order to store it as a TO address.

In some embodiments of the present invention, processor 12 may parse OS interactions to extract possible TO addresses and store all the extracted the possible TO addresses in database 16. For example, processor 12 may extract destinations located immediately after call instructions (after-call addresses), which may be possible return destinations. For example, processor 12 may extract start-of-function destinations, which may be possible destinations of call or jump instructions, for example indirect call or jump instructions. Processor 12 may store and/or maintain in database 16 a table of identified start-of-function addresses, i.e. addresses that point to starts of functions. Start-of-function addresses may be extracted by processor 12, for example, from parsed relocation table of a switch jump instruction, and stored in database 16. In some embodiments, start-of-function addresses are extracted by processor 12 by parsing the text section of an executed file, and/or getting addresses pointed to by direct calls and/or pointing to exported functions. In some embodiments, start-of-function addresses are extracted by processor 12 from debugging files, such as PDB files of an OS shared library function.

Figure 3:
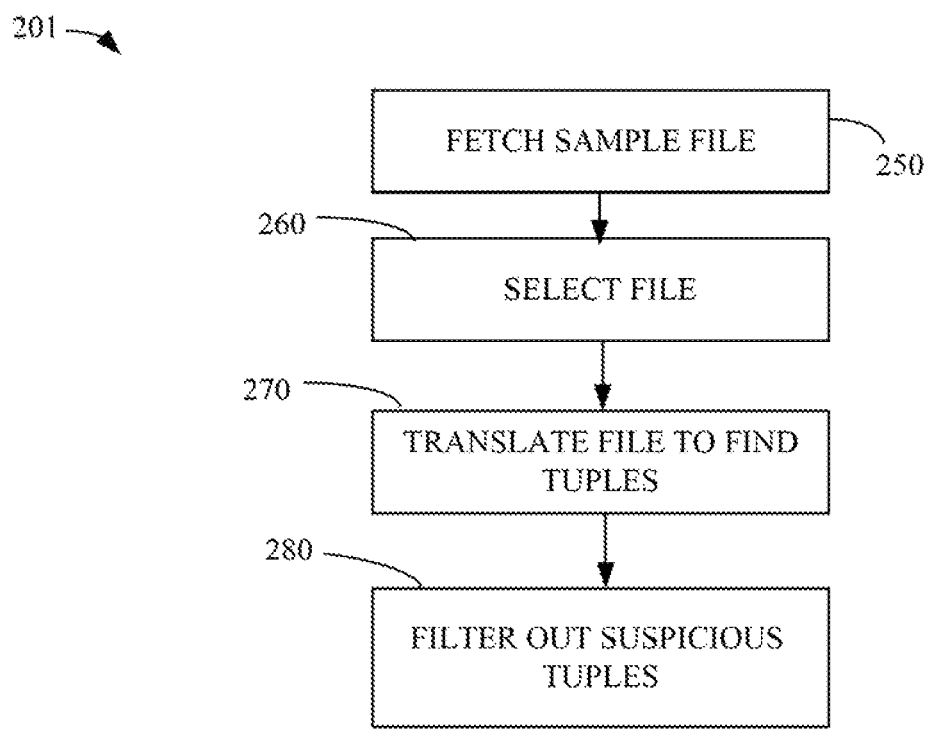
FIG. 3 is a schematic flowchart illustrating a method for dynamic learning, according to some embodiments of the present invention.

In some embodiments of the present invention, for example after all the FROM addresses are extracted by static learning engine 11, processor 12 may initiate dynamic learning by translation engine 13, to find TO addresses that correspond to the extracted FROM addresses. Reference is now made to FIG. 3, which is a schematic flowchart illustrating a method 201 for dynamic learning, according to some embodiments of the present invention, which may be performed by at least one hardware processor 12 by execution of translation engine 13.

As indicated in block 250, processor 12 may fetch a sample file that may open and/or run by a corresponding computer program, in some embodiments of the present invention, processor 12 may obtain the sample file by a web crawler 15. In some other embodiments, the sample file may include custom files stored in database 16 and/or available to processor 12. Processor 12 may store fetched sample file in a sample file repository 168 in database 16, for example along with custom-made files.

Processor 12 may use web crawler 15 for downloading files of a predetermined type or types from network 60. For example, in order to learn a certain program, sample files which open and/or run by the certain program are downloaded. For example, in case processor 12 is learning Adobe Reader, web crawler 15 may search for and/or download PDF files. In some embodiments, web crawler 15 may use a search engine for finding the sample files. For example, web crawler 15 may pick a random word out of a dictionary and search for a certain type of files, for example PDF files, that include the picked word. Web crawler 15 may download at least some of the files included in the search results. For example, of the returned results, web crawler 15 may pick a section of the search results, for example a random search result page, and download the files included in this page.

As indicated in block 260, processor 12 may select, from the fetched files, files which are different from the sample files already stored in repository 168. Processor 12 may calculate if a fetched sample file is a repeated file, i.e. the same as a previously fetched file stored in repository 168. Processor 12 may discard the file if it is a repeated file and store the file otherwise, e.g. if the fetched file is different than the sample files already stored in repository 168.

Figure 4:
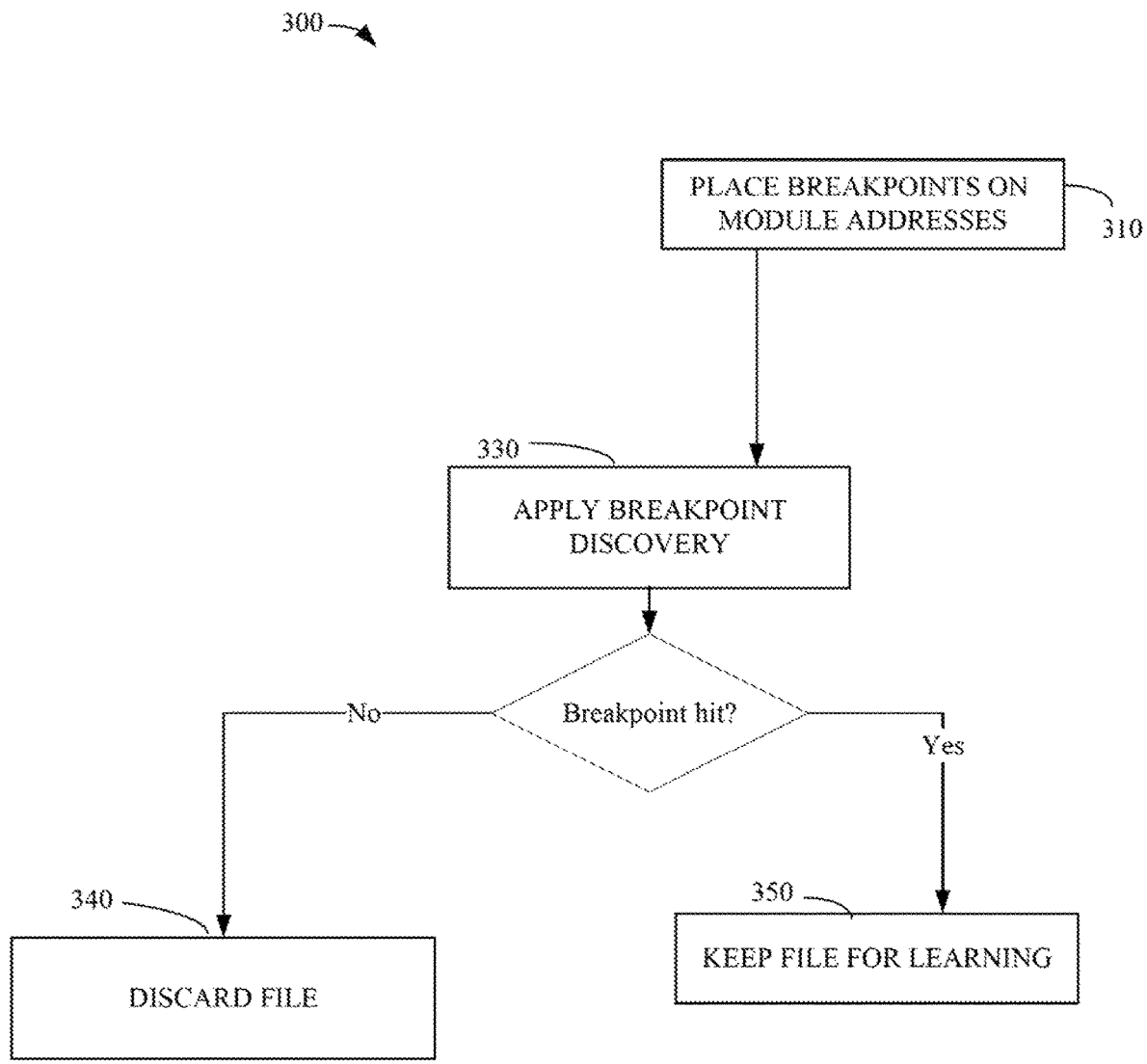
FIG. 4 is a schematic flowchart illustrating a breakpoint discovery method for selection of sample files, according to some embodiments of the present invention.

In some embodiment, processor 12 may execute a breakpoint discovery mechanism in order to make sure that each of the sample files stored in repository 168 is different. Reference is now made to FIG. 4, which is a schematic flowchart illustrating a breakpoint discovery method 300 for selection of sample files, according to some embodiments of the present invention. For example, processor 12 stores in database 16 a list that contains offsets of application modules, for example addresses found in the static learning process. As indicated in block 310, processor 12 may place breakpoints on the offset addresses. Translator 13 may dynamically run and/or otherwise analyze a fetched file to identify module addresses in a process of the file.

As indicated in block 330, processor 12 may apply breakpoint discovery, i.e. check if a module address marked with a breakpoint is identified in a process of the file. In case processor 12 does not identify in the file process an address marked with a breakpoint, as indicated in block 340, the file is discarded. In case a module address marked with a breakpoint is identified, as indicated in block 350, the file is kept as a sample file in database 168, and the corresponding breakpoint is removed from the list, so it will not be used again on future runs.

Returning to FIG. 2, as indicated in block 270, processor 12 may use translator 13 to dynamically translate a sample file from database 168, i.e. extract a corresponding list of address tuples used in execution of the file. As described in more detail herein, processor 12 may run sample files stored in database 168 with corresponding software applications, and extract tuple address encountered in the running process. Processor 12 may use the extracted tuple addresses to complete address tuples and/or to amend errors in tuple addresses extracted in the static learning process, for example compiling errors or any other possible errors. For example, tuples for which database 16 holds only a FROM address, may be completed with a corresponding TO address based on the tuples extracted by the dynamic translation. Additionally, processor 12 may identify in the translation process start-of function addresses and add then to a table of identified start-of-function and/or possible destination addresses in database 16.

For example, translation engine 13 executes a sample file, and specifically code instructions that relate to functions of the Operating System (OS). In some embodiments, translation engine 13 extracts from and/or during the file execution and records processes, modules and function address tuples used by processor 12 in executing a file, including OS function addresses the file points to or OS function addresses that point to locations in the file. Thus, for example, translation engine 13 generates a file execution record including, for example, a list of absolute tuple addresses and a list of module base addresses, and/or any other suitable data, as described in more detail herein. An address of a module such as a shared library function, for example within a shared library, may be varied between OS versions. An OS shared library may be, for example, a Dynamic-Link Library (DLL), which may store shared library functions. Throughout the present description, an OS shared library function is also called an OS function.

Translation engine 13 may identify code instructions that point to an OS shared library function when a file is executed by a software application. A file may include various kinds of instructions to point to an OS shared library function, such as an instruction to jump or call to an exported or inner OS shared library function, a callback instruction and/or instruction to return to a called OS shared library function. In some embodiments, by executing a file, translation engine 13 identifies code instructions that cause OS functions to point to locations in the file, and/or identifies addresses of such code instructions. As a result of the translation process, processor 12 may generate the file execution record of a corresponding file, the execution record may include processes, modules and/or function address tuples identified and/or extracted from and/or during the file execution.

Figure 5:
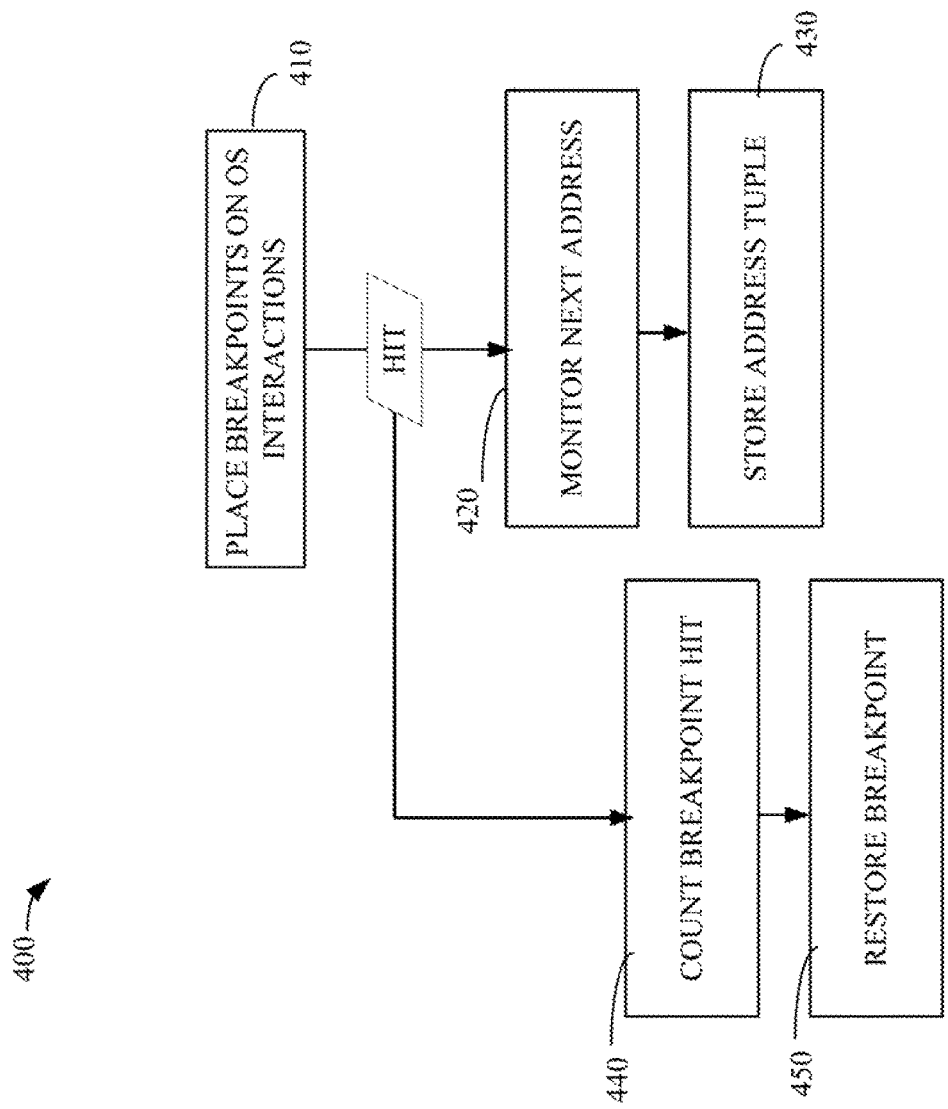
FIG. 5 is a schematic flowchart illustrating a breakpoint method for obtaining address tuples, according to some embodiments of the present invention.

In some embodiments of the present invention, processor 12 may identify in a sample file addresses of OS interaction instructions of interest such as, for example, indirect jump, indirect call and/or return instructions and place a breakpoint on such addresses. During dynamic learning, upon hitting a placed breakpoint while running a sample file, processor 12 may monitor the next address executed, thus obtaining an address tuple. Reference is now made to FIG. 5, which is a schematic flowchart illustrating a breakpoint method 400 for obtaining address tuples, according to some embodiments of the present invention.

As indicated in block 410, processor 12 may set a breakpoint on each OS interaction instruction of interest of a sample file. While running the sample file, as indicated in block 420 once hitting a breakpoint, processor 12 may monitor the next address executed, thus obtaining and/or storing an address tuple, as indicated in block 430. As indicated in block 440, once hitting a breakpoint processor 12 may count a breakpoint hit, e.g. increment a counter corresponding to the encountered breakpoint. Additionally, once hitting a breakpoint, as indicated in block 450, processor 12 may decide whether to re-set the breakpoint at the same address. The decision whether to re-set a breakpoint may be made by processor 12 according to a dedicated counter function. For example, the probability of re-setting a breakpoint may decrease as the breakpoint is encountered more frequently, thus, for example, preventing exaggerated repetition of hitting the same breakpoint. For example, the counter function may diverge as the counter value increases. In case processor 12 decides to reset the breakpoint, processor 12 may reset the breakpoint at the same address.

Back to FIG. 2, as indicated in block 280, after extracting the tuples, processor 12 may verify the address tuples and/or filter out suspicious tuples, thus, for example, keeping in database 166 only verified and/or safe tuples. In some embodiments of the present invention, in case a sample file is a custom-made file especially built for the learning process, it is assumed that all the tuples extracted from translation of this sample file are legitimate and therefore all are kept in database 166. In case a sample file is a file found by crawlers 15, the file may be malicious and therefore processor 12 may verify the address tuples, for example by performing shepherding on new address tuples, for example to check that the format of the tuple is familiar and/or proper.

In some embodiments of the present invention, in case of a tuple with a return function FROM address, processor 12 may calculate the address of the call corresponding to the return instruction. In some embodiments of the present invention, processor 12 scans the file code backwards from the return instruction, until teaching the call instruction. In case the return instruction is not after a corresponding call instruction, processor 12 may not approve the tuple in the verification process. Processor 12 may place a couple of address markers such as, for example, base pointers, a first one at the call instruction and a second one at the TO address. The address markers may be configured to trigger processor 12 to store a stack pointer of the called function when the first address marker is hit, and compare it to a current stack pointer when the second address marker is hit, i.e. at the TO address, which should have the same stack pointer of the called function. In case the stack pointers do not match, processor 12 may disprove the tuple. Processor 12 may execute the return instruction and monitor whether the address reached after the return instruction is executed is the expected location pointed to by the TO address. In case it is not the expected location, processor 12 may disprove the corresponding tuple.

Figure 6:
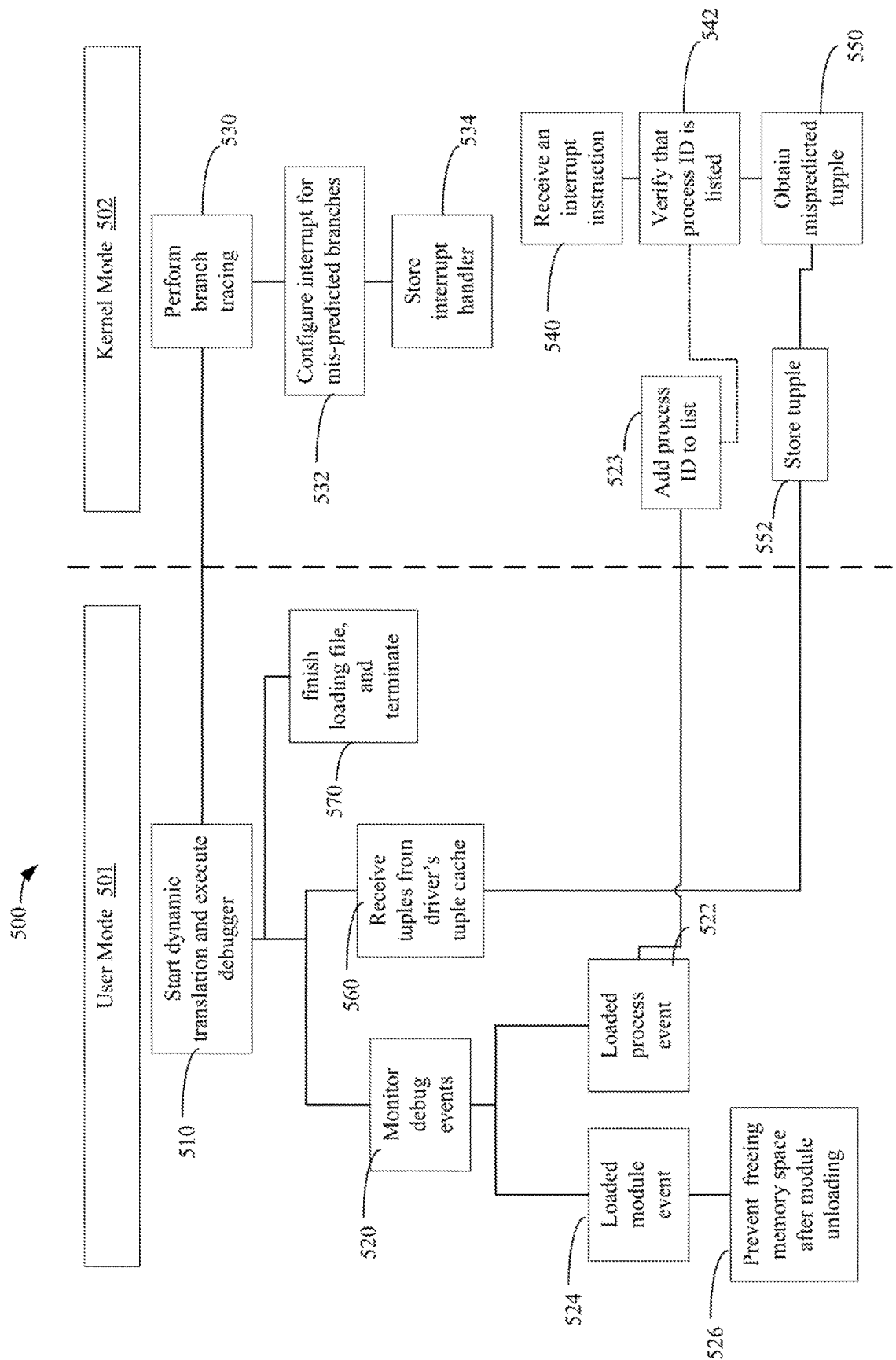
FIG. 6 is a schematic flowchart illustrating a dynamic learning method, according to some embodiments of the present invention.

Reference is now made to FIG. 6, which is a schematic flowchart illustrating a dynamic learning method 500, according to some embodiments of the present invention. Method 500 may include interactions between user mode 501 and kernel mode 502 of processor 12, wherein some steps are performed by processor 12 in user mode 501, some steps are performed by processor 12 in kernel mode 502, and there is an exchange of information between user mode 501 and kernel mode 502.

As indicated in block 510, in user mode 501, processor 12 may start the dynamic translation process of a sample file, in which the sample file is executed while processor 12 records the execution process, for example by executing a debugger 131, for example in parallel to execution of the file. The dynamic translation process may last until the sample file finishes loading, then the learning may be terminated as indicated in block 570.

As indicated in block 520 processor 12 may monitor debug events such as monitor each loaded process, as indicated in block 522, and/or module, as indicated in block 524. For example, processor 12 may generate an alert each time a new module and/or process is loaded, thus, for example, enabling processor 12 to record the module base address.

As indicated in block 523, upon loading of a new process, as identified by debugger 131, processor 12 may add in the kernel mode a corresponding process ID to a list of monitored processes.

During the dynamic translation, as indicated in block 530, processor 12 may perform branch tracing, such as by Last Branch Record (LBR) recording, to record the most recently executed branches. For example, processor 12 may store a set of last branch records, such as about 4 to about 32 last branch records, in a processor control register such as a Model Specific Register (MSR). Along with the last branch records, processor 12 may store for each recorded branch the corresponding address tuple including source (FROM) and destination (TO) addresses, e.g. the addresses referred to in the executed branch.

In some embodiments of the present invention, processor 12 may configure the LBR by sending a suitable input/output control (IOCTL) system call, for initiating the LBR recording in kernel mode 502. For example, processor 12 may configure the LBR recording to record only certain type or types of branches, for example branches of indirect call, indirect jump and return code instructions. Processor 12 may perform branch prediction to predict control instructions, for example based on the recently executed branches recorded in the LBR. Processor 12 may execute a performance counter MSR to count mispredicted branches.

As indicated in block 532, processor 12 may configure the performance counter MSR to produce an interrupt instruction upon each branch misprediction. In some embodiments of the present invention, the performance counter MSR is initially set to its maximal value, so that counting of any additional mispredicted branch causes an overflow. For example, processor 12 may configure an overflow callback instruction that causes initiation of a callback action whenever the performance counter MSR is overflown, e.g. upon each counting of a mispredicted branch. As indicated in block 534, processor 12 may store an interrupt handler, for example in an Interrupt Descriptor Table (IDT), instructing processor 12 how to act upon receiving an interrupt instruction, as indicated in block 540. In some embodiments, processor 12 may mark, tag and/or flag as mispredicted, the mispredicted branch and/or its corresponding address tuple stored in the LBR. After each overflow, processor 12 may reset the performance counter MSR to its maximal value.

In order to keep a process log of the learned processes, as indicated in block 542, processor 12 may store a process ID of the interrupted process in a monitored process list, unless the process ID is already stored in the list, for example as described above.

As indicated in block 550, in case an interrupt instruction is received, processor 12 may obtain from the LBR the mispredicted branch that triggered the performance counter and/or the corresponding address tuple. For example, processor 12 may find in the LBR the last stored branch marked as mispredicted. For example, processor 12 may iterate over the LBR stored branches from the top of the stack, i.e. from the last stored branch backwards, until finding a branch marked as mispredicted. Once finding the last stored branch marked as mispredicted, as indicated in block 552, processor 12 may store the branch's address tuple in a tuple cache in case the same address tuple is not already stored there.

Thus, for example, processor 12 may reduce repetition in the dynamic learning process, by obtaining a tuple cache of branches and their corresponding address tuples, in which each branch is different from the other. Therefore, by translation engine 13, processor 12 may receive a list of function address tuples used in the file execution, each is related to a certain user process, identified by a process ID. Back in the user mode, as indicated in block 560, processor 12 may obtain the address tuples stored in the cache, for example once a kernel process is completed. The address tuples received from the kernel may include absolute address that represent the location of the corresponding OS function in the process memory space. Processor 12 needs to identify the module and the module base address, to which the tuple belongs, for example according to the modules and their base addresses monitored by debugger 131.

The list of tuples may be received after the execution of a process has finished, wherein modules were loaded and unloaded during the execution period. For example, upon completion of a file and/or process execution, processor 12 may get a corresponding list of tuples with absolute addresses. By debugger 131 processor 12 may obtain a list of modules with their base address and may identify which tuple addresses belong to which modules.

In order to obtain the list of modules loaded during the execution of the process, processor 12 needs to take into account unloaded modules. Accordingly, as indicated in block 526, processor 12 may prevent storage of a module in a same memory space as a previously unloaded module, by marking the memory space of the unloaded module as occupied. Thus, for example, another base address may be kept in relation to each loaded module, which may enable processor 12 to identify, according to the absolute addresses, which tuples belong to each module. For example, processor 12 may obtain and/or monitor a Process Environment Block (PEB) that includes a list of all currently loaded modules and their corresponding base addresses. Once a module is unloaded, processor 12 may mark the base address of the unloaded module as occupied rather than free.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor, or a portable device such as a smart phone or a tablet computer, or a micro-processor, or a RISC processor, or a DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or electronic circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry. The processor and program may constitute the same apparatus, at least partially, such as an array of electronic gates, such as FPGA or ASIC, designed to perform a programmed sequence of operations, optionally comprising or linked with a processor or other circuitry.

The term 'configuring' and/or 'adapting' for an objective, or a variation thereof, implies using at least a software and/or electronic circuit and/or auxiliary apparatus designed and/or implemented and/or operable operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprising", "including" and/or "having" and other conjugations of these terms, when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A system for generating a database of tuple addresses associated with a computer program and executable files associated with the computer program, the system comprising:

a learning server including a hardware processor configured to execute code to perform a method for generating the database of tuple addresses associated with the computer program and executable files associated with the computer program, the method including:

performing a static learning process to identify tuple FROM addresses and TO addresses associated with the execution of a sample file by the computer program, the static learning process parsing executable code associated with the execution of the sample file by the computer program to determine the computer program interactions with an operatively associated operating system (OS), the OS interactions including at least one of a call instruction, jump instruction, return instruction and other instruction which directs the computer program to an associated OS destination from an associated computer program FROM address, the static learning process generating a complete list of tuple FROM addresses associated with the OS interactions and an incomplete list of TO addresses associated with the OS interactions, and the static learning process storing the generated complete list of tuple FROM and incomplete list of TO addresses in the database of tuple addresses associated with the computer program; and performing a dynamic learning process to identify tuple FROM addresses and TO addresses associated with the execution of the sample file by the computer program, the dynamic learning process:

determining the computer program interactions with the operating system (OS) while executing the sample file, the OS interactions including at least one of a call instruction, jump instruction, return instruction and other instruction which directs the computer program to an associated OS destination from an associated computer program FROM address, obtaining a first list comprising a plurality of loaded modules with base addresses;

obtaining a second list comprising a plurality of branches with corresponding tuple addresses each representing a location for one of the OS interactions associated with the execution of the sample file;

comparing the first list and the second list;

determining which of each of the plurality of branches with corresponding tuple addresses correspond to each of the plurality of loaded modules with base addresses;

eliminating any repeating branches of the plurality of branches with corresponding tuple addresses;

obtaining a tuple cache comprising a plurality of non-repeating branches with corresponding tuple addresses and the corresponding plurality of loaded modules with base addresses, wherein obtaining the tuple cache reduces an amount of repetition in the dynamic learning process compared to the amount of repetition in a second dynamic learning process without the tuple cache, wherein the dynamic learning process is supplementing the static learning process to provide TO addresses not identified during the static learning process and complete the list of TO addresses generated and stored in the database of tuple addresses during the static learning process, and wherein the static learning process and dynamic learning process are performed on a plurality of sample files to populate the database of tuple addresses associated with the computer program.

2. The system for generating a database of tuple addresses according to claim 1, wherein a verification process is performed to validate tuple addresses before tuple addresses are added to the database of tuple addresses associated with the computer program.

3. The system for generating a database of tuple addresses according to claim 1, wherein the method for generating the database of tuple addresses associated with the computer program is performed for a plurality of computer programs and respective executable files associated with the plurality of computer programs, and the database of tuple addresses includes a sub-database for tuple addresses for each computer program and respective executable files.

4. The system for generating a database of tuple addresses according to claim 1, wherein the sample files are acquired using one or more of a web crawler and a sample file database.

5. The system for generating a database of tuple addresses according to claim 1, wherein the database of tuple addresses is used to detect potentially malicious code associated with one or more email attachments.

6. The system for generating a database of tuple addresses according to claim 1, wherein a breakpoint discovery process is used for selection of sample files included in the database.

7. The system for generating a database of tuple addresses according to claim 1, wherein a branch predictor and associated branch misprediction counter are used to trigger the dynamic learning process.

8. The system for generating a database of tuple addresses according to claim 1, wherein the method for generating the database of tuple addresses is executed using a debugger process running parallel to an execution of the sample file by the computer program.

9. A method for generating a database of tuple addresses associated with a computer program and executable files associated with the computer program, the method comprising:

using a learning server including a hardware processor configured to execute code to perform the method for generating the database of tuple addresses associated with the computer program and executable files associated with the computer program, performing a static learning process to identify tuple FROM addresses and TO addresses associated with the execution of a sample file by the computer program, the static learning process parsing executable code associated with the execution of the sample file by the computer program to determine the computer program interactions with an operatively associated operating system (OS), the OS interactions including at least one of a call instruction, jump instruction, return instruction and other instruction which directs the computer program to an associated OS destination from an associated computer program FROM address, the static learning process generating a complete list of tuple FROM addresses associated with the OS interactions and an incomplete list of TO addresses associated with the OS interactions, and the static learning process storing the generated complete list of tuple FROM and incomplete list of TO addresses in the database of tuple addresses associated with the computer program; and performing a dynamic learning process to identify tuple FROM addresses and TO addresses associated with the execution of the sample file by the computer program, the dynamic learning process determining the computer program interactions with the operating system (OS) while executing the sample file, the OS interactions including at least one of a call instruction, jump instruction, return instruction and other instruction which directs the computer program to an associated OS destination from an associated computer program FROM address, obtaining a first list comprising a plurality of loaded modules with base addresses;

obtaining a second list comprising a plurality of branches with corresponding tuple addresses each representing a location for one of the OS interactions associated with the execution of the sample file;

comparing the first list and the second list;

determining which of each of the plurality of branches with corresponding tuple addresses correspond to each of the plurality of loaded modules with base addresses;

eliminating any repeating branches of the plurality of branches with corresponding tuple addresses;

obtaining a tuple cache comprising a plurality of non-repeating branches with corresponding tuple addresses and the corresponding plurality of loaded modules with base addresses, wherein obtaining the tuple cache reduces an amount of repetition in the dynamic learning process compared to the amount of repetition in a second dynamic learning process without the tuple cache, wherein the dynamic learning process is supplementing the static learning process to provide TO addresses not identified during the static learning process and complete the list of TO addresses generated and stored in the database of tuple addresses during the static learning process, and wherein the static learning process and the dynamic learning process are performed on a plurality of sample files to populate the database of tuple addresses associated with the computer program.

10. The method for generating a database of tuple addresses according to claim 9, wherein a verification process is performed to validate tuple addresses before tuple addresses are added to the database of tuple addresses associated with the computer program.

11. The method for generating a database of tuple addresses according to claim 9, wherein the method for generating the database of tuple addresses associated with the computer program is performed for a plurality of computer programs and respective executable files associated with the plurality of computer programs, and the database of tuple addresses includes a sub-database for tuple addresses for each computer program and respective executable files.

12. The method for generating a database of tuple addresses according to claim 9, wherein the sample files are acquired using one or more of a web crawler and a sample file database.

13. The method for generating a database of tuple addresses according to claim 9, wherein the database of tuple addresses is used to detect potentially malicious code associated with one or more email attachments.

14. The method for generating a database of tuple addresses according to claim 9, wherein a breakpoint discovery process is used for selection of sample files included in the database.

15. The method for generating a database of tuple addresses according to claim 9, wherein a branch predictor and associated branch misprediction counter are used to trigger the dynamic learning process.

16. The method for generating a database of tuple addresses according to claim 9, wherein the method for generating the database of tuple addresses is executed using a debugger process running parallel to an execution of the sample file by the computer program.

17. A system for detecting potential malicious content included in a candidate file executable by a computer program, the system using a database of tuple addresses associated with the computer program and sample executable files associated with the computer program, the system comprising:
   a file processing server including a hardware processor configured to execute code to perform a method of detecting potentially malicious content in the candidate file using the database of tuple addresses associated with the computer program and sample executable files associated with the computer program, the method including:
      the file processing server generating a tuple address list associated with the execution of the candidate file by the computer program; and
      the file processing server determining the candidate file potentially includes malicious content if the candidate file generated tuple address list is inconsistent with at least some of the tuple addresses included in the database of tuple addresses associated with the computer program and sample executable files associated with the computer program,
      wherein the database of tuple addresses associated with the computer program and sample executable files associated with the computer program is generated by a learning server including a hardware processor configured to execute code to perform a method for generating the database of tuple addresses associated with the computer program and sample executable files associated with the computer program, the method including:
   performing a static learning process to identify tuple FROM addresses and TO addresses associated with the execution of the computer program and a sample executable file, the static learning process parsing executable code associated with the execution of the sample file by the computer program to determine the computer program interactions with an operatively associated operating system (OS), the OS interactions including at least one of a call instruction, jump instruction, return instruction and other instruction which directs the computer program to an associated OS destination from an associated computer program FROM address, the static learning process generating a complete list of tuple FROM addresses associated with the OS interactions and an incomplete list of TO addresses associated with the OS interactions, and the static learning process storing the generated complete list of tuple FROM and incomplete list of TO addresses in the database of tuple addresses associated with the computer program; and
   performing a dynamic learning process to identify tuple FROM addresses and TO addresses associated with the execution of the sample executable file by the computer program, the dynamic learning process determining the computer program interactions with the operating system (OS) while executing the sample file, the OS interactions including at least one of a call instruction, jump instruction, return instruction and other instruction which directs the computer program to an associated OS destination from an associated computer program FROM address,
      obtaining a first list comprising a plurality of loaded modules with base addresses;
      obtaining a second list comprising a plurality of branches with corresponding tuple addresses each representing a location for one of the OS interactions associated with the execution of the sample file;
      comparing the first list and the second list;
      determining which of each of the plurality of branches with corresponding tuple addresses correspond to each of the plurality of loaded modules with base addresses;
      eliminating any repeating branches of the plurality of branches with corresponding tuple addresses;
      obtaining a tuple cache comprising a plurality of non-repeating branches with corresponding tuple addresses and the corresponding plurality of loaded modules with base addresses, wherein obtaining the tuple cache reduces an amount of repetition in the dynamic learning process compared to the amount of repetition in a second dynamic learning process without the tuple cache,
   wherein the dynamic learning process is supplementing the static learning process to provide TO addresses not identified during the static learning process and complete the list of TO addresses generated and stored in the database of tuple addresses during the static learning process, and
   wherein the static learning process and the dynamic learning process are performed on a plurality of sample executable files to populate the database of tuple addresses associated with the computer program.

18. The system for detecting potential malicious content included in a candidate file according to claim 17, wherein a verification process is performed to validate tuple addresses before tuple addresses are added to the database of tuple addresses associated with the computer program.

19. The system for detecting potential malicious content included in a candidate file according to claim 17, wherein the method for generating the database of tuple addresses associated with the computer program is performed for a plurality of computer programs and respective executable files associated with the plurality of computer programs, and the database of tuple addresses includes a sub-database for tuple addresses for each computer program and respective executable files.

* * * * *